Patented Oct. 7, 1947

2,428,355

UNITED STATES PATENT OFFICE 2,428,355

AMINO-SUBSTITUTED ACRIDINES AND
METHOD OF MAKING THE SAME

Joseph H. Burckhalter, Detroit, Eldon M. Jones
and Albert L. Rawlins, Grosse Pointe Woods,
Frank H. Tendick, Grosse Pointe Park, and
Walter F. Holcomb, Detroit, Mich., assignors to
Parke, Davis & Company, Detroit, Mich., a corporation of Michigan No Drawing. Application June 12, 1944,
Serial No. 539,990

3 Claims. (Cl. 260—279)

This invention relates to certain new derivatives of aryl amines, and in particular concerns an amino-substituted acridine having the formula

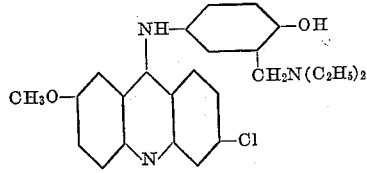

The substituted acridine having the above formula is a useful therapeutic agent and is characterized by its toxicity to protozoa, particularly plasmodia. This new compound may be used in the form of its salts of hydrochloric acid, sulfuric acid, phosphoric acid, sulfamic acid, acetic acid, lactic acid, tartaric acid, gluconic acid, citric acid, and alkyl sulfonic acids or as the insoluble salt of methylene disalicylic acid.

The amino-substituted acridine of the present invention may be prepared by condensing equimolar portions of a substituted aryl amine, containing a primary amino group, and an acridine halide in a suitable solvent. The reaction may be carried out in the presence of a mineral acid or in the presence of alkali. The transformation involved in this procedure may be represented as follows:

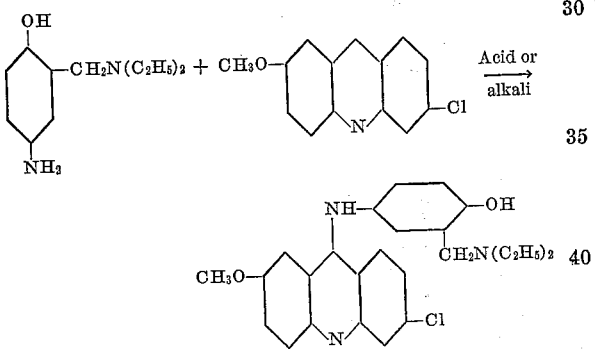

Another method of obtaining the amino-substituted acridine of this invention involves the direct condensation of an N-acyl derivative of the formula

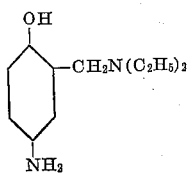

with an acridine halide in acid solution, e. g.

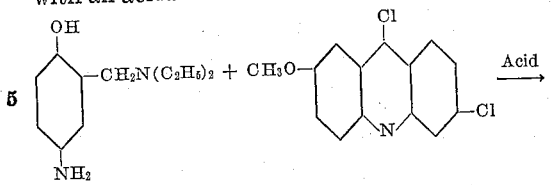

This process probably involves hydrolysis of the acylated compound followed immediately by condensation.

The following example illustrates this invention:

Example.—2 - methoxy - 6 - chloro-9-(3'-diethylaminomethyl - 4' - hydroxyphenylamino) -acridine dihydrochloride

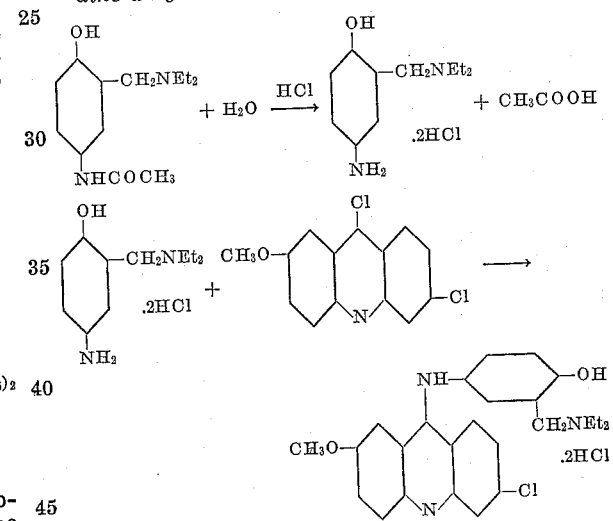

A mixture of 23.6 g. of 2-diethylaminomethyl-4-acetylaminophenol and 50 cc. of concentrated hydrochloric acid is heated for two hours at refluxing temperature. The pH of the cooled solution is adjusted to about 4 through the addition of concentrated sodium hydroxide solution. The resulting solution is then added to a suspension of 27.8 g. of 2-methoxy-6,9-dichloroacridine in 50 cc. of either methyl or ethyl alcohol and the mixture warmed in a steam bath until a clear solution is obtained. After rapid filtration, heating is continued for over an hour. The mixture is cooled and the orange, crystalline dihydrochloride collected on a Buchner funnel. The product is washed with a small volume of water and then with acetone; it decomposes at 278–280° C. Recrystallization of the salt from methanol does not elevate its melting point.

The same dihydrochloride can also be prepared by treatment of the isolated 2-diethylaminomethyl-4-aminophenol dihydrochloride, in methyl or ethyl alcohol solution, with 2-methoxy-6,9-dichloroacridine. When methyl alcohol is used, yields are improved by precipitation of the final product with acetone.

Attention is directed to our copending application, Serial No. 571,961, filed January 8, 1945, as a continuation-in-part of the instant case wherein we have described and broadly claimed a class of acridine compounds which includes the acridine compounds specifically disclosed and claimed herein. Attention is also directed to our copending application, Serial No. 629,713, filed November 19, 1945, which describes and claims another class of somewhat related acridine compounds. Attention is also directed to other copending applications wherein certain quinoline compounds are described and claimed as follows: Serial No. 556,496, filed September 29, 1944; Serial No. 576,900, filed February 8, 1945; Serial Nos. 626,906, 626,907 and 626,908, all filed November 5, 1945; and Serial No. 722,474, filed January 16, 1947.

What we claim as our invention is:

1. A compound of the class consisting of a free base and its acid addition salts, said free base having the formula

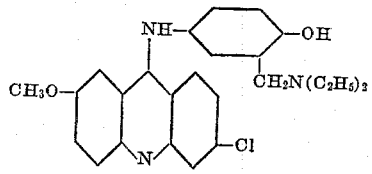

2. A compound having the formula

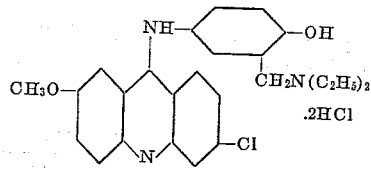

3. Process for preparing a compound having the formula,

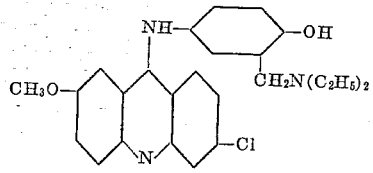

which comprises reacting 2-diethylaminomethyl-4-aminophenol and 2-methoxy-6,9-dichloroacridine.

JOSEPH H. BURCKHALTER.
ELDON M. JONES.
ALBERT L. RAWLINS.
FRANK H. TENDICK.
WALTER F. HOLCOMB.

REFERENCES CITED

The following references are of record in the file of this patent:

UNITED STATES PATENTS

| Number | Name | Date |
|---|---|---|
| 2,220,835 | Bruson | Nov. 5, 1940 |